June 25, 1929.  W. HOLLINGSWORTH  1,718,419
BRONZING MACHINE
Filed Feb. 12, 1926    10 Sheets-Sheet 1

Fig. 1.

Inventor
W. Hollingsworth
By C.A. Snow & Co.
Attorneys.

June 25, 1929.  W. HOLLINGSWORTH  1,718,419
BRONZING MACHINE
Filed Feb. 12, 1926    10 Sheets-Sheet 2

Fig. 2.

Inventor
W. Hollingsworth
By C. A. Snow & Co.
Attorneys.

June 25, 1929. W. HOLLINGSWORTH 1,718,419
BRONZING MACHINE
Filed Feb. 12, 1926 10 Sheets-Sheet 4

Inventor
W. Hollingsworth
By C.A.Snow & Co.
Attorneys

June 25, 1929.  W. HOLLINGSWORTH  1,718,419
BRONZING MACHINE
Filed Feb. 12, 1926   10 Sheets-Sheet 5

Inventor
W. Hollingsworth
By C. A. Snow & Co.
Attorneys.

June 25, 1929.  W. HOLLINGSWORTH  1,718,419
BRONZING MACHINE
Filed Feb. 12, 1926   10 Sheets-Sheet 8

Fig.17.

W. Hollingsworth Inventor

By C.A.Snow & Co.
Attorneys.

Fig. 18.

Patented June 25, 1929.

1,718,419

UNITED STATES PATENT OFFICE.

WILLIAM HOLLINGSWORTH, OF BALTIMORE, MARYLAND.

BRONZING MACHINE.

Application filed February 12, 1926. Serial No. 87,826.

This invention relates to a machine of that type designed to apply powdered bronze to surfaces of paper sheets or the like on which the designs to be produced in bronze have been printed with a suitable size.

It is an object of the present invention to provide a means for positively feeding the printed sheets to the machine in properly timed relation whereby bronze, in controllable quantities, is directed onto each sheet and thereafter spread thereover so that all of the sized portions of the sheet will receive a coating of bronze.

A further object is to provide simple and efficient rubbing means for the bronze, there being additional means within the machine for removing the surplus bronze from the sheets after which said bronze can be returned to the reservoir or hopper and again applied to the sheets passing through the machine.

A further object is to provide a machine of this character which is practically dustless, thereby eliminating the harmful effects often resulting from the use of bronzing machines of other types.

A still further object is to provide novel gripping means whereby the sheets are conveyed through the machine in properly timed relation.

Another object is to provide a novel form of feed for directing the sheets into the bronzing portion of the machine, this means acting as a gauge whereby the sheets are at all times properly set before entering the bronzing portion.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings.

Referring to the figures by characters of reference 1 designates a frame of any desired construction provided, at one end, with a housing 2 in which is located the bronzing mechanism. Leading to this housing and extending longitudinally of the frame is a table 3 designed to support the mechanism utilized for feeding printed sheets into the housing. A mechanism for delivering the completed sheets from the bronzing mechanism is arranged within the frame below the table 3 and will be fully described hereinafter.

Feeding mechanism.

Extending longitudinally of the table 3 is a series of parallel endless belts 4 mounted on pulleys 5 located within the receiving end portion of the table 3 and secured to a transverse shaft 6. This shaft is provided with a sprocket 7 receiving motion through a chain 8 from another sprocket 9 secured to a transverse shaft 10. To this shaft is secured a pulley 11 adapted to be driven by a belt 12 from a pulley 13 located at the delivery end of the table 3 and rotatable with a tubular shaft 14. Another shaft 15 is journaled within and extends transversely of the table close to the shaft 14 and is provided with a series of pulleys 16 on which the belts 4 are mounted. Pulleys 16 extend into openings 17 in the table and the upper flights of the belts 4 are adapted to rest upon and slide along the top surface of the table 3.

Figure 1:
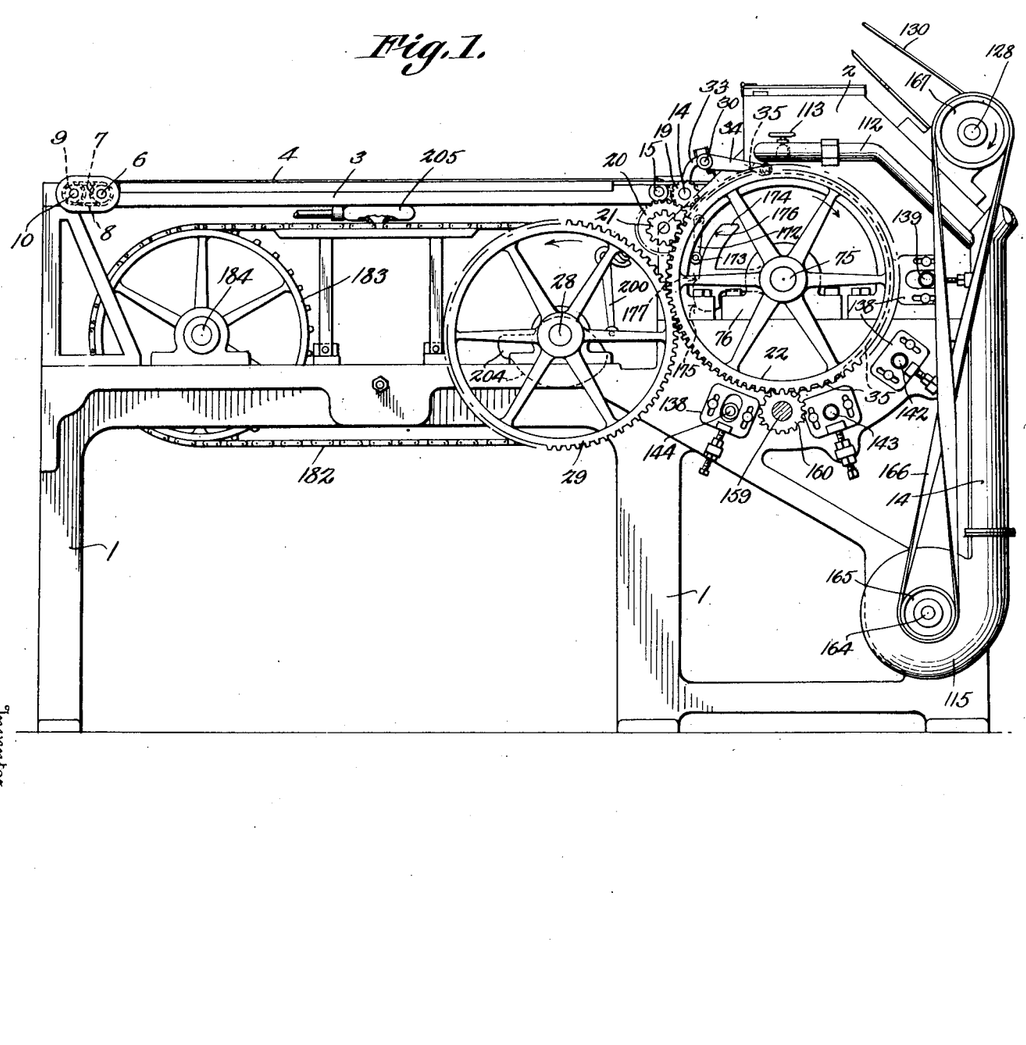
Figure 1 is an elevation of one side of the machine.
Figure 4:
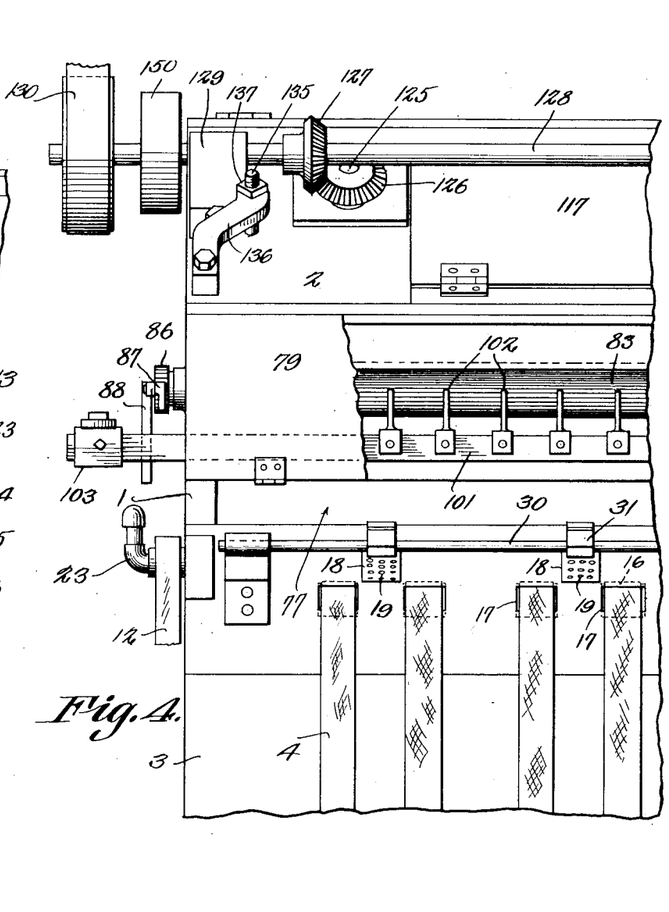
Figure 4 is a plan view of a portion of the structure shown in Figure 3, some of the parts being broken away.

Mounted on the tubular shaft 14 so as to rotate therewith is a series of rollers 18 each of which is formed with apertures 19 extending from the periphery of the roller and opening into the tubular shaft. These rollers 18 are located in line with certain of the spaces between the belts 4 but beyond those end portions of the belt nearest the delivery end of the table. This relative arrangement of parts is clearly shown in Figure 4. The tubular shaft has a gear 19 at one end meshing with a gear 20 (see Figure 1) and this gear, in turn, rotates with a gear 21 meshing with and receiving motion from a large master gear 22.

A suction pipe 23 communicates with one end of the tubular shaft 14 and extends to a suitable suction pump (not shown). A valve 24 is arranged in this pipe and has a stem 25 adapted to be engaged by an actuating lever 26. This lever cooperates with a cam 27 connected to and rotating with a shaft 28 which extends transversely under the table adjacent the delivery end thereof. A gear 29 is secured to this shaft and meshes with the master gear 22 located at the other side of the machine.

Figure 3:
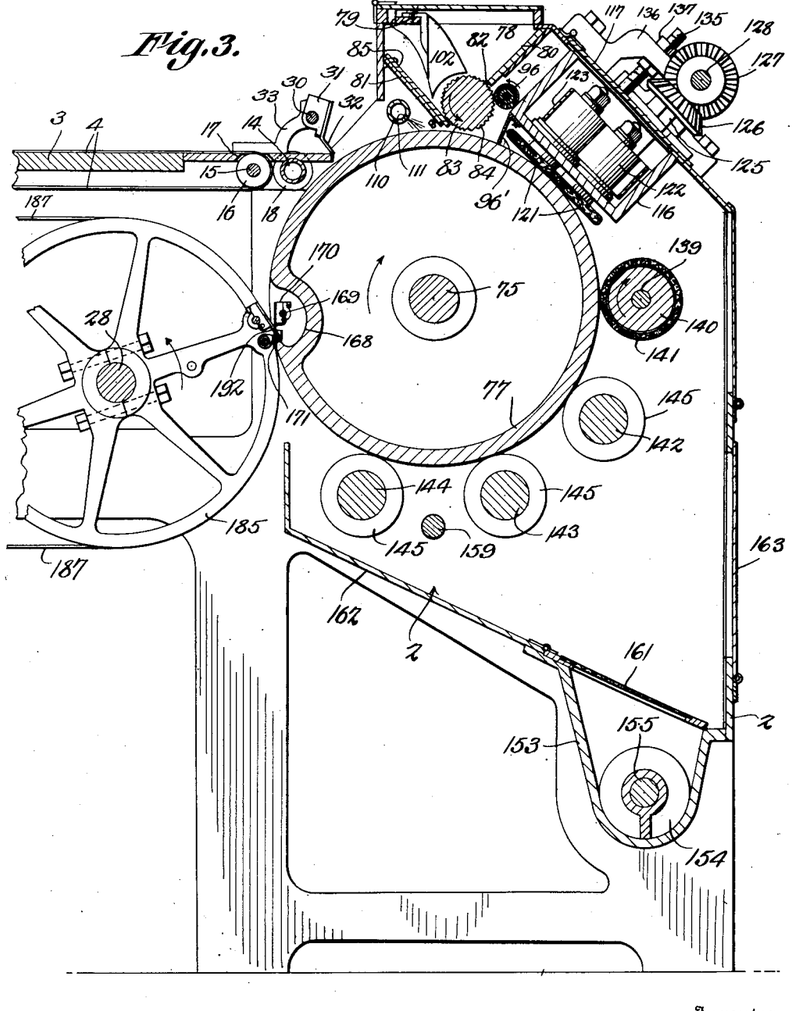
Figure 3 is an enlarged vertical longitudinal section through the bronzing portion of the machine.

A stop or gage is provided at the delivery end of the table 3 and includes a transverse shaft 30 provided with a desired number of blocks 31 to which are connected downwardly extending fingers 32 normally resting against the end of the table 3 as shown in Figure 3. Shaft 30 is preferably journaled in brackets 33 at the sides of the table and extending from one end of this shaft is a gripping arm 34 cooperating with a cam 35 located at the inner side of and rotatable with the master gear 22.

As heretofore stated the stop fingers 32 normally rest against the table 3. During the operation of the machine the belts 4 are so driven that the upper flights thereof travel toward the stop fingers 32. The gears and other parts of the transmission mechanism are so timed and proportioned that the peripheral movement of the rollers 18 is much faster than the movement of the belts 4. During the operation of the master gear 22 motion is transmitted therefrom through the gears 21 and 19 to the tubular shaft 14 and from this tubular shaft through the pulley and belt transmission and the chain 8 and sprockets 7 and 9 to the belts 4. The sheets to be bronzed are positioned one behind the other on the belts 4 and will be carried thereby toward the housing 2. The advancing edge of a sheet will thus be brought against the stop fingers 32 and for an instant following this operation the belts 4 will slip under the sheets so as to cause the advancing edge of the sheets to be forced against and straightened out by the series of stop fingers. Immediately following the straightening of the sheet in this manner the cam 35 actuates the arm 34 so as to swing the stop fingers 32 out of the path of the sheet and at the same time the cam 27 on shaft 28 will actuate lever 26 and cause the valve 24 to open. Thus a suction will be established through the apertured rollers 18 which are under the advancing end portion of the sheet and these rollers, which heretofore have been revolving under the sheet without actuating it, will promptly grip the sheet and direct it at a high speed off of the delivery end of table 3 into the housing 2. Following the delivery of the sheet the arm 34 will be permitted by cam 35 to return to its normal position with the result that the stop fingers 32 will reassume their normal positions. Cam 27 and lever 26 cooperate so as to establish a suction through pipe 23 through the rollers 18 only during the time the sheet is being fed to the gripping mechanism. Immediately thereafter the suction is broken by the return of lever 26 to its normal position.

From the foregoing description it will be apparent that a sheet, while being fed to the bronzing mechanism, will first be properly alined with its advancing edge in proper position and will thereafter be projected at an increased speed into the housing of the bronzing mechanism.

The mechanism already described for the purpose of accelerating the delivery of a sheet after it has been alined, constitutes only one form of apparatus that may be used for this purpose. Other forms have been illustrated in Figures 13, 14, 15 and 16.

Figures 13, 14, 15, 16:
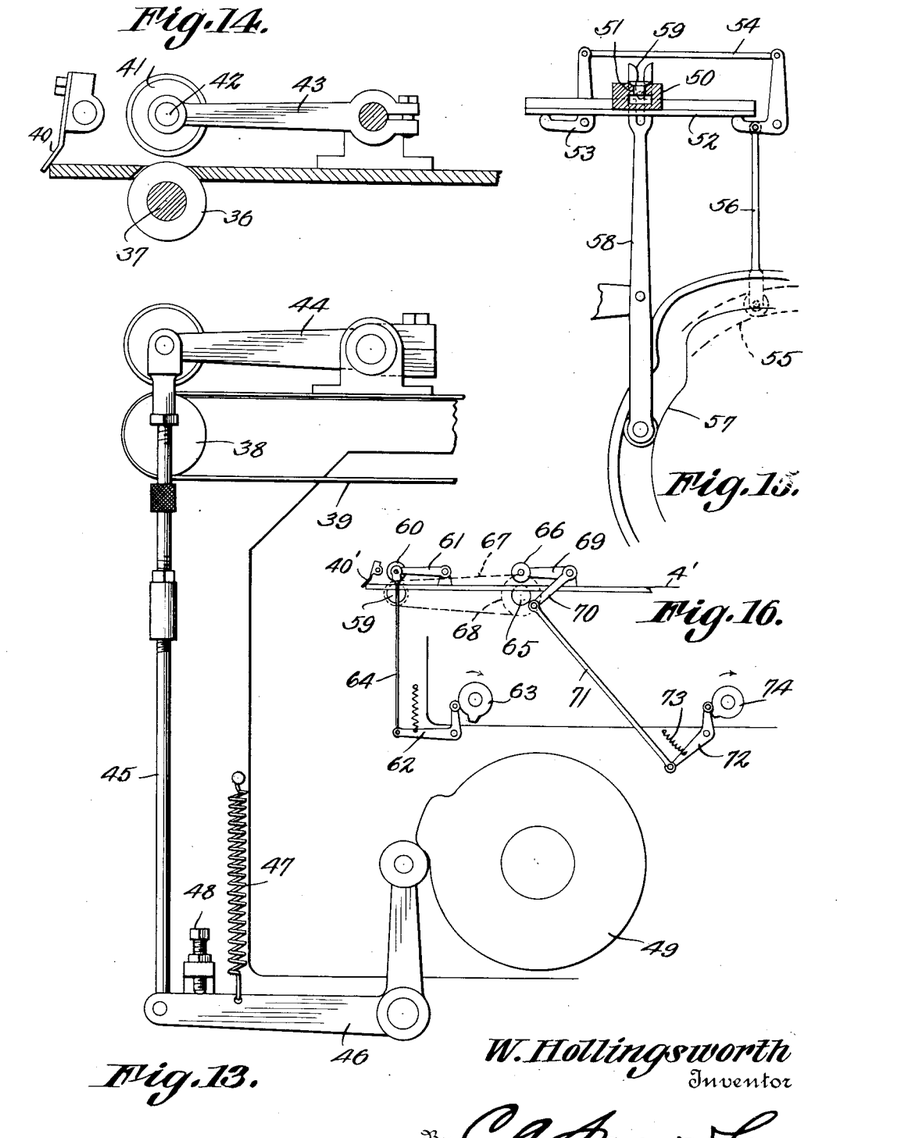
Figure 13 is a side elevation of a portion of a modified mechanism for feeding sheets to the bronzer.
Figure 14 is a vertical longitudinal section therethrough.
Figure 15 is a view partly in side elevation and partly in section of a portion of another modified form of sheet feeding means.
Figure 16 is a view, showing more or less in diagram, another means for feeding sheets to the bronzing mechanism.

In the structure illustrated in Figures 13 and 14 it is not designed to use suction as a means for gripping a sheet and feeding it into the bronzing mechanism. Instead a desired number of rollers, one of which has been illustrated at 36 in Figure 14 are substituted for the suction rollers and are secured to a shaft 37 having a pulley 38 engaged by a belt 39 corresponding with the belt 12 heretofore described. These roller are revolving constantly so that their peripheral speed is greater than the surface speed of the cylinder 77. Ordinarily, however, the rotation of these rollers 36 will not have any effect upon the sheet but, instead, said rollers will revolve under the sheet and merely cause said sheet to press lightly against the stop fingers 40 which correspond with the fingers 32. Immediately thereafter, however, some pinching rollers 41 carried by pins 42 extending from pivotally mounted arms 43 will be pulled downwardly so as to grip the sheet between the rollers 41 and 36 with the result that said sheet will be propelled forwardly at the same speed as the peripheral speed of the rollers. This operation takes place immediately following the lifting of the stop fingers 40 in the manner heretofore explained.

For the purpose of actuating the arms 43 an adjustable rod 45 connects an arm 44, movable with arms 43, to a bell crank 46, this bell crank being yieldingly supported in one position by a spring 47 and being limited in its movement under the action of the spring by an adjustable stop 48. A cam 49 corresponding with the cam 27 is adapted to engage one end of the bell crank at properly timed intervals and thereby to cause the pinching rollers 41 to move against and grip the sheet after said sheet has been alined against the stop fingers 40 and said fingers have been lifted as heretofore explained.

In Figure 15 there has been shown a modified pneumatic means for imparting the accelerated movement to the alined sheet. In this figure there is shown a suction head 50 having a plurality of inlets 51 in the top thereof only one of which has been shown in Figure 15, however. This head is adapted to extend transversely under the sheet being fed and is slidably mounted on a track 52. This track is supported by bell cranks 53 which are connected by a rod 54 or in any other suitable manner. A cam 55 can be used for actuating a lifting rod 56 and another cam 57 can be used for actuating a lever 58. The upper end of this lever can be forked as shown at 59 so as to slidably and pivotally engage the suction head 50.

The parts described can be so timed that, after the sheet being fed into the machine has been alined against the stop fingers already described, the cams 55 and 57 can be brought into play so as to shift the rod 56 and the lever 58 in properly timed relation. When rod 56 is shifted upwardly the apertured face of the suction head 50 is against the bottom surface of the sheet which has been alined. Immediately thereafter a suction will be established as heretofore described with reference to the rollers 18 and lever 58 will then be shifted to slide the suction head 50 quickly along the track. On the completion of this sliding movement the suction will be broken and the track 50 will be lowered due to the properly timed action of the cams and the parts cooperating therewith. Thus the alined sheet will be fed quickly into the bronzing portion of the machine.

In Figure 16 another means for accelerating the movement of the sheet into the bronzing portion of the machine has been shown more or less in diagram. In this mechanism, however, a means has been disclosed for retarding the movement of the accelerated sheet in time to prevent it from crumpling against stops 40' as a result of the momentum imparted to the sheet. In this modified structure there is shown a feeding roll 59 provided for the same purpose as the rolls 36 and cooperating with a pinching roll 60 carried by one or more arms 61. This pinching roll is actuated in the same manner as illustrated in Figure 13, there being a bell crank 62 for transmitting motion from a cam 63 to a rod 64 and thence to the arm 61.

For the purpose of overcoming the momentum of the sheet as the sheet reaches the stop fingers 40', an additional arrangement of rollers is provided, including one or more lower rollers 65 and one or more upper rollers 66. The lower rollers are driven by any suitable means, such as a belt 67 and pulley 68 and have a peripheral speed less than the speed of the belts 4'.

The belts 4' which correspond with the belts 4 heretofore described, are designed to carry the paper at a high speed longitudinally of the feed table. Just before the sheet of paper reaches the stop fingers 40', the roller 66 is moved downwardly so as to pinch the sheet between said roller and the roller 65. As these two rollers are revolving at a surface speed much less than the speed of the movement of the belt 4' it will be apparent that the instant the sheet is pinched between the two rollers 65 and 66 its movement will be retarded while the belts 4' will continue to travel at the same speed under the retarded sheet. Promptly following this retardation of the sheet the roller 66 is moved upwardly whereupon the rapidly moving belts 4' will gradually overcome the inertia of the sheet and draw the sheet against the stop fingers 40'. Thus the sheet will be properly positioned at the end of the table and at the proper time during the operation of the machine the fingers 40' will be lifted out of the path of the paper and the roller 60 will pinch the paper against the roller 59. These two rollers will therefore cooperate to project the sheet away from the belts 4' and into position for engagement by the gripping mechanism of a drum forming part of the bronzing mechanism. By providing a means such as described for controlling the movement of the sheet there is no danger of the sheet crumpling when brought against the fingers 40' in the path thereof.

Any desired means can be provided for actuating the roller 66. For example the arm 69 or other structure carrying the roller can be caused to swing with a crank arm 70 and this crank arm, in turn, can be connected by a rod 71 to a bell crank 72. A spring 73 serves to hold the bell crank and the roller 66 normally in one position but a cam 74, rotating in properly timed relation, will shift the bell crank 72 to cause the roller 66 to pinch the sheet at the proper time during the operation of the mechanism.

It will be noted that in all of the structures thus far described the sheet to be bronzed will be fed along the table toward the bronzing mechanism, will be properly alined, and will thereafter be shifted at a greatly increased speed into the bronzing mechanism.

Bronzing mechanism.

The bronzing mechanism, as heretofore stated, is located within a housing indicated generally at 2 and which housing is located at one end of the table 3. Extending transversely of the housing is the shaft 75 of the master gear 22, this shaft being journaled within bearings 76 carried by the side portions of the frame 1. A transfer drum 77 is secured to and rotates with the shaft 75 and extends from one side to the other of the housing 2. Located close to and above the drum is a hopper 78 extending throughout the width of the housing and formed with a hinged cover 79 which is normally closed. The bottom of the hopper is formed of downwardly converging bottom sections 80 and 81 spaced apart along their lower edges to provide a slot 82 in which is located a feeding roll 83. This roll is formed in its periphery with shallow grooves extending lengthwise of the roll as indicated at 84. A plate 85 is adjustably mounted on the bottom section 81 and by shifting this plate the space between the periphery of the roll and the section 81 can be regulated.

Figure 2:
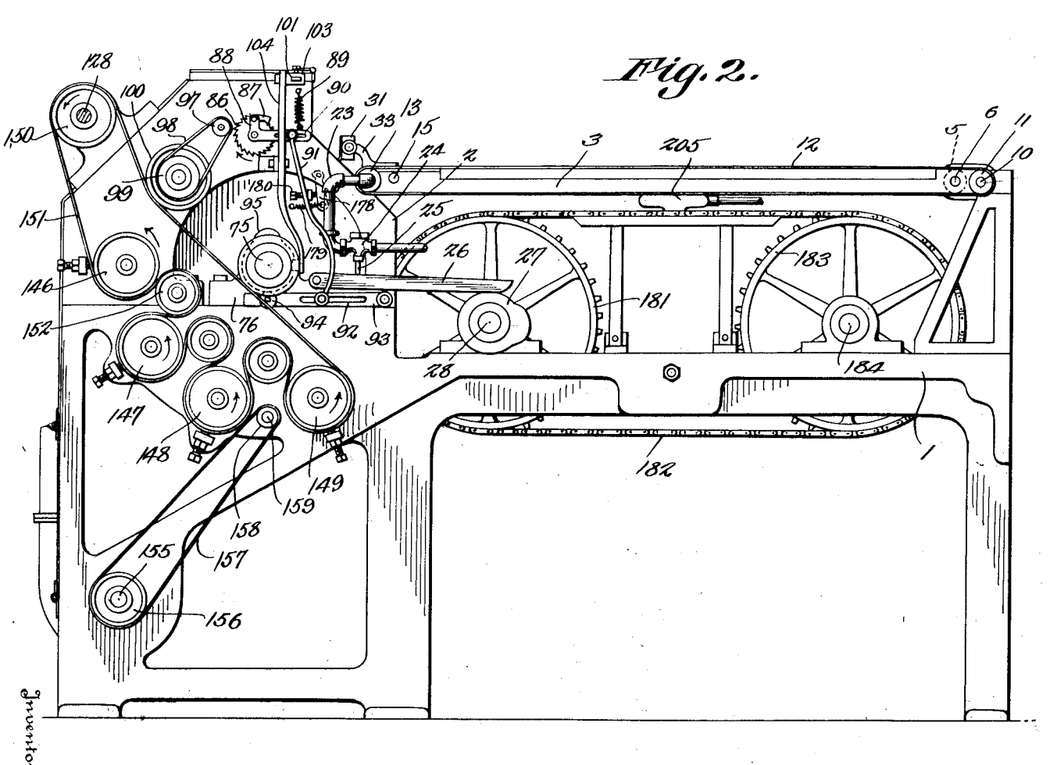
Figure 2 is an elevation of the other side of the machine.

A ratchet wheel 86 is connected to one end of the roll 83 and is adapted to be engaged and actuated by a pawl 87 carried by a lever 88 as shown in Figure 2. This lever is yieldingly held normally in one position by a spring 89 and a slot 90 is formed longitudinally within one end portion of the lever. A rod 91 is pivotally and adjustably connected to this slotted portion of the lever and the other end of the rod is similarly connected to the slotted portion 92 of a lever 93 fulcrumed on one side of the housing 2. This lever has a roller 94 engaging a cam 95 connected to and rotatable with the shaft 75. Thus as the shaft 75 and drum 77 rotate with the master gear 22, cam 95 will intermittently depress lever 93 and cause the rod 91 to pull on lever 88. After each depression of lever 93 the parts will be returned to their initial positions by the spring 89. Each time lever 93 is depressed the pawl 87 cooperates with the ratchet wheel 86 to rotate the grooved roll 83. This rotation will be in the direction of the arrow shown in Figure 3.

It is to be understood of course that the hopper 78 is to receive a quantity of powdered material such as used in bronzing labels and the like. Each time the roll 83 is rotated a portion of the bronze, filling the upper grooves 84, will be carried downwardly through the slot 82 and past the adjustable plate 85 to position close to the top of the drum 77. The greater portion of the bronze will drop from the grooves onto the drum. Any material remaining in the grooves will be removed therefrom by a small revolving brush 96 arranged under the bottom section 80 where it will work upon the surface of the roll. This brush can be operated in any manner desired. For example a pulley 97 may be located at one end of the shaft of the brush and receive motion through a belt 98 from a pulley 99 rotatable with a pulley 100 located on one side of the housing 2 as shown in Figure 2.

Figure 12:
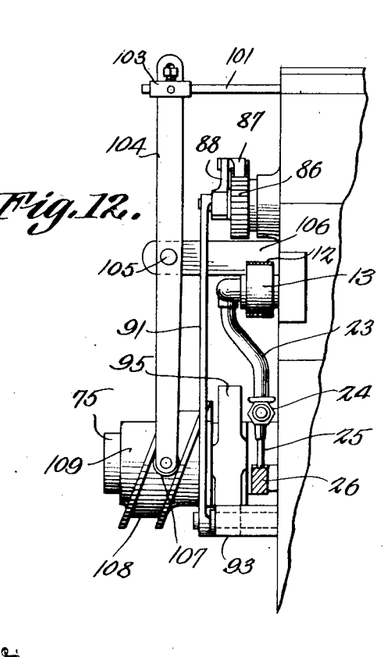
Figure 12 is an elevation of a portion of the mechanism employed for controlling the delivery of bronze.

For the purpose of agitating the contents of the hopper and thereby preventing packing, a bar 101 is slidably mounted within the upper portion of the hopper and extends longitudinally thereof. Blades 102 are extended backwardly and downwardly from this bar and terminate close to the roll 83. One end of the bar projects laterally beyond the housing and has a sleeve 103 adjustably mounted thereon. To this sleeve is pivotally connected one end of a lever 104 fulcrumed at 105 on a bracket 106. The lower end of this lever has a roller 107 adapted to work within a cam groove 108 provided in a sleeve 109 on the shaft 75. This construction is shown in detail in Figure 12. It will be obvious that, during the rotation of shaft 75 lever 104 will be oscillated and will cause the bar 101 to reciprocate. Consequently the blades 102 will work back and forth within the hopper close to the roll 83 and prevent the material in the hopper from packing.

For the purpose of scattering the bronze powder over the sheet when fed into the housing 2, a pipe 110 is extended transversely within the housing between the upper portion of drum 77 and the bottom section 81 of hopper. This pipe has outlet openings 111 for directing jets of air towards the pass between drum 77 and roll 83. A pipe 112 containing a controlling valve 113 opens into one end of the pipe 110 and is adapted to direct an air current thereto from the outlet pipe 114 of a blower casing 115. Obviously as the bronze powder is directed onto the drum 77 in the manner heretofore explained, the air currents delivered from the pipe 110 will scatter the bronze over the drum and direct it towards the spreading or rubbing mechanism.

This spreading mechanism includes a box 116 secured to and depending from the top of the housing and provided with a closure 117 which is normally shut. In this box are disposed bushings 118 in staggered relation and in each of which is journaled a shaft 119. Each shaft supports a disk 120 below the box 116, the working face of each disk as well as the peripheral portion thereof being covered with a suitable rubbing material such as sheep skin or lamb skin from which the hair has not been removed. These coverings have been indicated generally at 121. These rubbing elements are designed to bear upon a sheet mounted on the drum 77 and pulleys 122 are secured to the shafts 119 at points within the box 116. These pulleys are engaged by an endless belt 123 and the belt also engages a drive pulley 124 secured to a shaft 125 extending through the top of the housing 2. A gear 126 is secured to the outer end portion of shaft 125 and meshes with a gear 127 secured to the drive shaft 128. This drive shaft is journaled in bearings 129 on the top of housing 2 and is adapted to be driven by any suitable means, such as a belt 130 shown in Figure 1. The shafts 119 are disposed at opposite sides of a plane extending longitudinally of the drum or cylinder 77 and radiating therefrom and are parallel with said plane. Thus the rubbing action of the disks 121 occurs away from their centers where their surface speed is greatest, thereby preventing accumulations of bronzing material at the center of the rubbing surfaces and generally improving the rubbing action.

Figure 5:
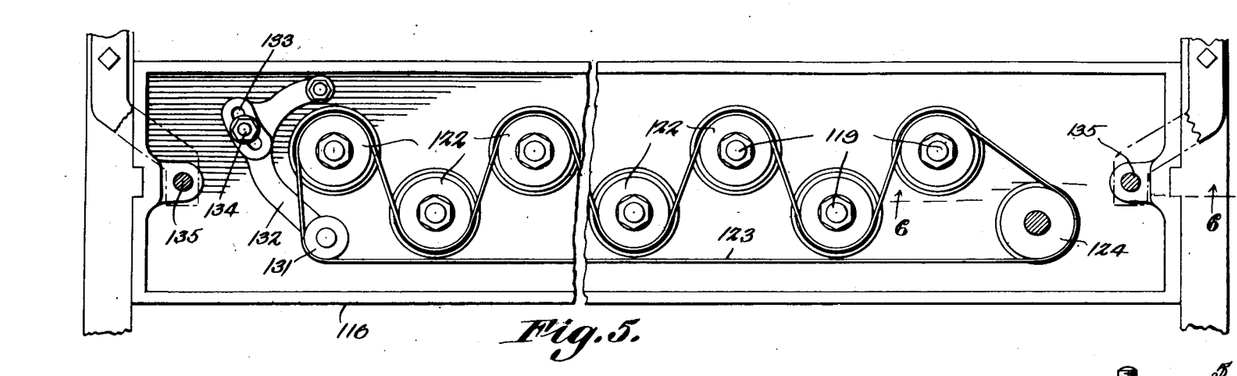
Figure 5 is a plan view of the drive mechanism of the rubbing disks, said view being substantially in section on line 5—5 of Figure 6.
Figures 6, 7:
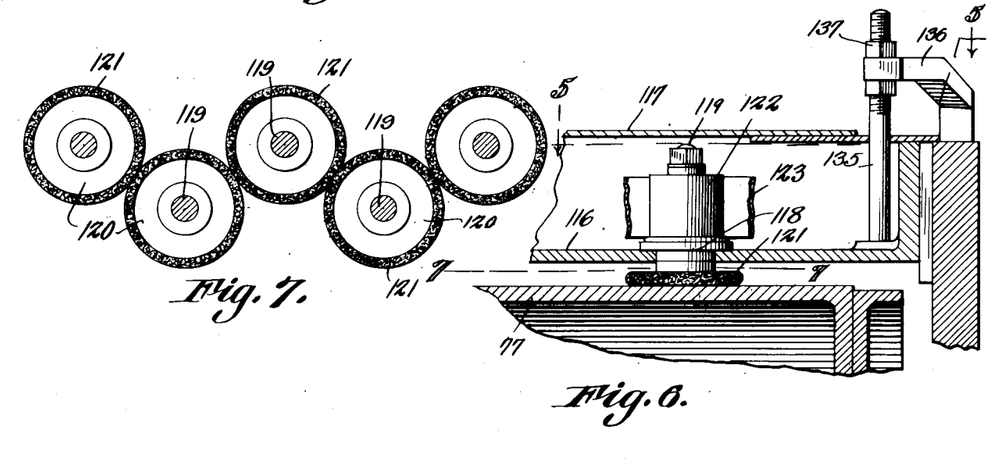
Figure 6 is a longitudinal section on line 6—6 Figure 5.
Figure 7 is a section through the shaft of several of the rubbing disks, said section being taken substantially on the line 7—7 Figure 6.
Figures 8, 10:
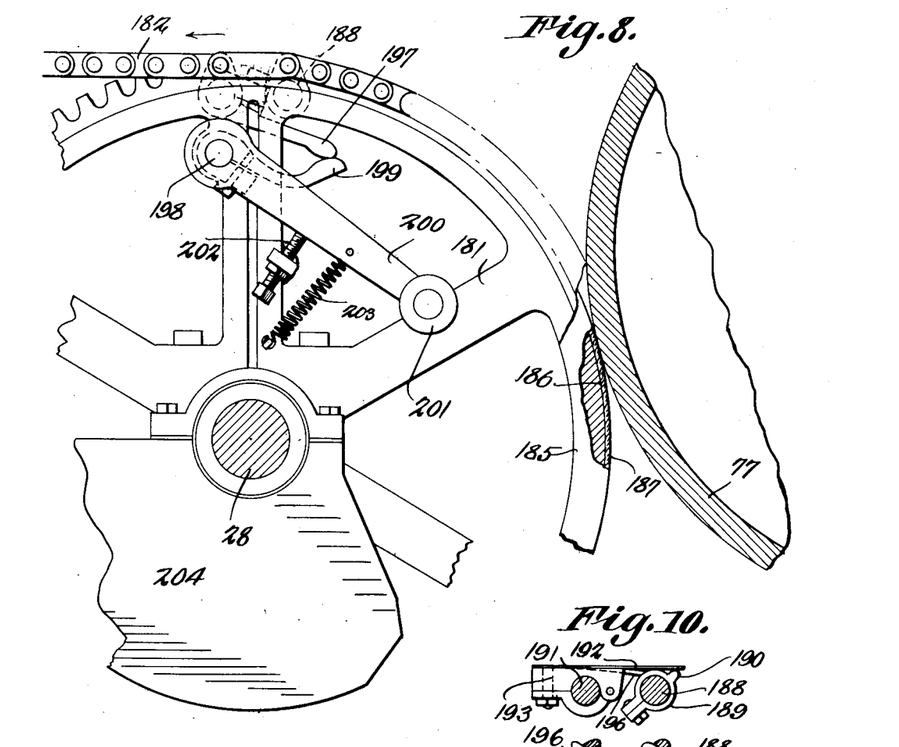
Figure 8 is a view partly in elevation and partly in section of the meeting portions of the gripper drum and the delivering conveyor.
Figure 10 is a section on line 10—10 Figure 9.

The belt 123 can be provided with a tightener in the form of a pulley 131 connected to one end of a lever 132. This lever can be formed with a slot 133 for the reception of a clamping bolt 134. Obviously the lever can be adjusted angularly to tighten belt 123 and can thereafter be held by tightening the bolt 134. This construction is illustrated in Figure 5. It will be noted that the box 116 is adjustably mounted so as thereby to adjust the rubbing disks relative to the drum 77. This adjustable support of the box includes threaded stems 135 extending through the top of the housing 2 and through brackets 136 mounted on said housing. Nuts 137 engage the stems and brackets and by adjusting these nuts the stems can be shifted longitudinally relative to the brackets 136, thereby to raise or lower the box 116 and correspondingly shift the rubbing disks relative to the surface of drum 77.

During the operation of the machine motion will of course be transmitted from the drive shaft 128 to the rubbing disks 120 which will rotate as indicated by arrows in Figure 5. The bronze powder having been dropped on a sheet carried by drum 77 will be scattered over the sheet by the air blasts or jets from the openings in pipe 110. This powder will come under the rotating rubbing disks and the hair covered skins on the disks will act to thoroughly rub the powder over the surface of the sheet and thereby insure application of the powder to all parts of the sheet so as to adhere to those portions of the surface of the sheet to which size has been applied.

Adjustably mounted on the end portions of the housing 2 are bearings 138 arranged in pairs. The bearings of one pair are engaged by the end portions of the shaft 139 to which is secured a polishing roll 140 the peripheral portion of which is provided with a covering 141 of lamb's wool. Additional shafts 142, 143 and 144 are regularly spaced under drum 77 and on each of these shafts is mounted a wiper consisting of fabric disks 145 pressed together tightly on the shaft to provide a substantially cylindrical wiping roll. The polishing surface or covering 141 of roll 140 and the peripheral portions of the wiping rolls are all adapted to contact lightly with the surface of a sheet mounted on the drum 77. Shaft 139 is provided, at one end, with a pulley 146 and similar pulleys, indicated at 147, 148 and 149 are mounted on the shafts 142, 143 and 144 respectively. A pulley 150 is secured to the drive shaft 128 and is engaged by an endless belt 151. Idler pulleys 152 are located adjacent the pulleys 146, 147, 148 and 149 and the belt 151 is extended between these various pulleys so that pulleys 150, 146, 147, 148 and 149 will all be rotated in the same direction and at the same speed. Pulley 100 is also driven by the belt 151.

From the foregoing it will be apparent that after a sheet to which bronze has been applied has passed between drum 77 and the rubbing disks, it will next pass between said drum and the roll 140. As that portion of the roll engaging the sheet is travelling oppositely to the direction of travel of the sheet, a polishing effect will result. After the sheet passes from between the drum 77 and the polishing roll 140, it will be acted on by the wiping cylinders or rolls 145 and all loose bronze will be removed from the sheet and directed into the bottom portion of the housing 2. The bottom of the housing is inclined downwardly toward a collecting trough 153 in which is located a worm conveyor 154. This conveyor is mounted on a shaft 155 one end of which is provided with a pulley 156. This pulley is adapted to receive motion through a belt 157 from a pulley 158 carried by a second drive shaft 159. This second drive shaft is extended transversely of the housing and has a gear 160 which meshes with and is adapted to actuate the master gear 22.

An inclined screen 161 may be hingedly connected to the inclined bottom 162 of housing 2, this screen normally extending over the top of the trough 153. A door 163 can be provided in one wall of the housing 2 so as to give access to this screen and to the interior of the lower portion of the housing. This door is normally closed and it will be apparent that as the distribution and application of the powdered bronze takes place within a normally closed housing, it will not be possible for the powder or dust to float into the surrounding atmosphere. This has been a very objectionable feature characteristic of some bronzing machines heretofore constructed.

A fan, not shown, is located within the casing 115 and the worm 154 is adapted, when rotated, to feed the bronze powder into the casing 115 where it will be expelled by the fan through the pipe 14 to a suitable container provided for the bronze. This bronze can afterwards be returned in any manner desired to the hopper 78. The shaft 164 of the fan is provided with a pulley 165 for receiving motion through a belt 166 from a pulley 167 secured to the shaft 128. It is to be understood of course that a portion of the air carrying the bronze through the pipe 14 will pass into the branch pipe 112 and be delivered through the apertures 111.

*Transfer and delivery mechanism.*

The drum 77 is provided in its periphery with a longitudinal channel 168 and extending longitudinally of this channel is a rock shaft 169 clamped between blocks 170 arranged in pairs and said pairs being spaced apart desired distances. To one block of each pair is attached a spring gripping finger 171 adapted to swing into and out of contact with drum 77 at points along one wall of the channel 168. An arm 172 is connected to one end of the shaft 169 and carries a roller 173 at its free end adapted to come against a stationary cam 174 secured to one of the sides of the frame 1. A portion of this cam has its active edge nearer the path of the shaft 167 than the remaining portion, these two portions 175 and 176 being connected by an inclined shoulder 177. Thus it will be seen that once during each rotation of the master gear 22 and the drum 77, the roller 173 will come against the lower end of the cam 174 and ride onto the edge portion 175. Thus shaft 169 will be rocked to swing the fingers 171 out of contact with the drum 77 at the time of movement of the finger past the point of delivery between drum 77 and the delivery mechanism. In Figure 3 the fingers 171 have been closed against the drum prior to being shifted by the contact of the roller 173 with the lower end portion of the cam 174. Obviously as soon as the fingers are swung outwardly by said roller 173 coming against the edge 175, a sheet gripped by the fingers will be released. Thereafter the roller 173 will move inwardly along the shoulder 177 and against the edge 175, thus causing the fingers 171 to partly close toward the drum 77. The fingers will maintain this partly closed position until after the free ends thereof have passed above the level of the table 3 at which time roller 173 will move off of the end of the cam 174 and the fingers will be permitted to close toward the drum 77. The mechanism is so timed that before the fingers swing inwardly against the drum 77, a sheet of material to be bronzed is projected by the feeding mechanism into position against the upper portion of the drum where the advancing edge of the sheet will pass between the drum and the slightly elevated fingers 171. This is possible in view of the fact that the speed of movement of the sheet into the housing 2 is greater than the peripheral speed of the drum 77. As the fingers 171 close toward the drum immediately following the positioning of a sheet on the drum, it will be apparent that said sheet will be gripped by the fingers and carried thereby with the drum 77 so as to move beneath the disks 120 and past the rolls 140 and 145 and thence to the point of delivery, which is the point at which the fingers 171 are positioned in Figure 3.

For the purpose of holding the gripping fingers 171 normally pressed against the drum 77, an arm 178 is extended from one end of the rock shaft 169 and has a spring 179 connecting the free end portion of said arm to the end of the drum 77. An adjustable stop 180 may be carried by the end of the drum for limiting the swinging movement of the arm 178. In this connection attention is called to Figure 2 of the drawing.

The shaft 28 heretofore mentioned is provided near its ends with sprockets 181 on which are mounted endless chains 182 also engaging sprockets 183 carried by a transverse shaft 184 journaled on the frame 1. Secured to the shafts 28 and 184 between the sprockets thereon are wheels 185 having grooves 186 in their peripheries for the reception of endless belts 187 in the form of cords. These belts constitute means for supporting a sheet after it has been delivered from the drum 77, and for conveying said sheet longitudinally of the frame to the outlet end thereof or to any other point of delivery. Obviously instead of providing these grooved wheels 185 and the endless belts mounted thereon, a stationary frame formed of light rods or the like may be mounted between the upper flights of the chains 182 as to support a sheet while being dragged thereover.

Figure 9:
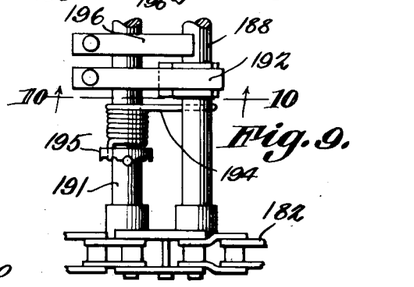
Figure 9 is a plan view of a portion of the chain of the delivering conveyor, showing one of the grippers carried thereby.
Figure 11:
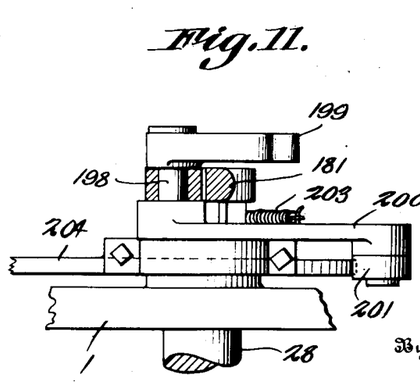
Figure 11 is a plan view of the gripper controlling lever and adjacent parts, the spoke of the sprocket to which it is connected being shown in section.

The means employed for gripping the sheets when delivered from drum 17 and conveying them longitudinally within the frame 1 has been illustrated in detail in Figures 8, 9, 10 and 11 of the drawing. Transverse rods 188 are connected to the links of the two chains 182 at regular intervals. These rods do not rotate. Each rod has a collar 189 clamped thereon at one or more points and each collar is provided with an outwardly extending gripping rib 190. A shaft 191 is journaled within the two chains close to each of the rods 188 and is parallel with the rods. Each shaft has a gripping finger 192 formed of spring metal or the like attached to a block 193 which is clamped upon the shaft so as to oscillate therewith. A spring finger 194 is extended from the shaft 191 and extends under the rods 188 thereby to hold the gripping finger 192 pressed yieldingly against the rib 190. As shown in Figure 9 the tension of this spring finger can be regulated by attaching one end of the spring to a collar 195 adjustable angularly on the shaft 191. Light stop fingers 196 preferably formed of spring metal are secured to the shaft 191 and adapted to bear upon the rod 188.

One end of each shaft 191 is provided with an arm 197 extended substantially in a direction opposite to that in which the shaft 191 is travelling with the chains 182. This arm is so located as to travel close to the inner sides of the sprockets 181 and 183 located at one side of the machine. One of these sprockets, 181, has a short shaft 198 journaled therein. Extending from the inner end of this shaft is a tripping finger 199 while an operating arm 200 is extended from the other end of the shaft and carries a roller 201 at its free end. An adjustable stop 202 is carried by the sprocket for the purpose of limiting the movement of arm 200 toward the shaft 28 and a spring 203 holds the arm 200 normally pressed against this stop.

A stationary cam 204 is fixedly connected to the frame 1 and is located in the path of the roller 201. As shown particularly in Figure 1 this cam is so shaped that, as the gripping fingers 192 are approaching the point of transfer shown in Figure 3, the roller 201 will be pressed outwardly from shaft 28 and against the action of spring 203 so as thereby to cause the finger 199 to press against arm 197 and rotate shaft 191 to position where the fingers 192 are spaced from the ribs 190. The parts are in this position as the fingers 192 come to position between the fingers 171 as shown in Figure 3. Thus the advancing edge of the gripped sheet on the drum 77 will be brought to position between the lifted fingers 192 and the ribs 190 and simultaneously with the shifting of the fingers 191 away from drum 77 to release the gripped sheet, as heretofore explained, the roller 201 will pass off of the fixed cam 204 and the spring 203 will snap the finger 199 away from arm 197 and at the same time spring 194 will rock shaft 191 to cause the fingers 192 to clamp upon the advancing edge of the sheet and bind it on the ribs 190. Thus continued movement of the parts will result in the sheet traveling with the chains 182 and into position on the belts 187 or other supporting means provided therefor.

The arm 197 will of course move away from the finger 199 as the sprocket 181 rotates but the mechanism is so timed that when the arm 197 of another gripping mechanism approaches the bottom portions of the sprockets 181, the roller 201, which is moving downwardly with the sprocket, will come against the near end of the cam 204 and thereby cause the finger 199 to swing downwardly. At this time the arm 197 of one of the gripping mechanisms will have arrived close to and in the path of finger 199. Consequently the shifting of arm 200 by the cam 204 will result in the said arm 197 swinging downwardly and against the action of spring 194 so as to move the gripping fingers 192 away from the ribs 190. The fingers will be maintained in these positions relative to the ribs 190 by the cam 204 until they are again brought to transferring position at which time the operation already described will be repeated.

If the sheet is gripped by the fingers 192 at the time of the opening of said fingers as already explained, said sheet will of course be released at a point beneath the chains 182 and can be deposited as a part of a stack of sheets accumulated under the machine.

However any desired means can be employed for releasing the sheet at other points and conveying the same from the machine.

For the purpose of removing any loose particles remaining on the sheets after they have passed out of the bronzing mechanism, a suction head 205 can be located close to and above the path of the sheets. By setting up a light suction through this head any particles of dust on the sheet can be lifted therefrom without retarding the movement of the sheet through the machine.

A baffle plate 96' is located between the roll 83 and the rubbing disks 120 to prevent the bronze powder from blowing past the disks and their shafts 119.

The stops or gages 32 not only act to straighten out or properly position the sheets before entering the bronzing mechanism but they also hold back the sheets so that they will not enter the said mechanism prematurely.

Figure 17:
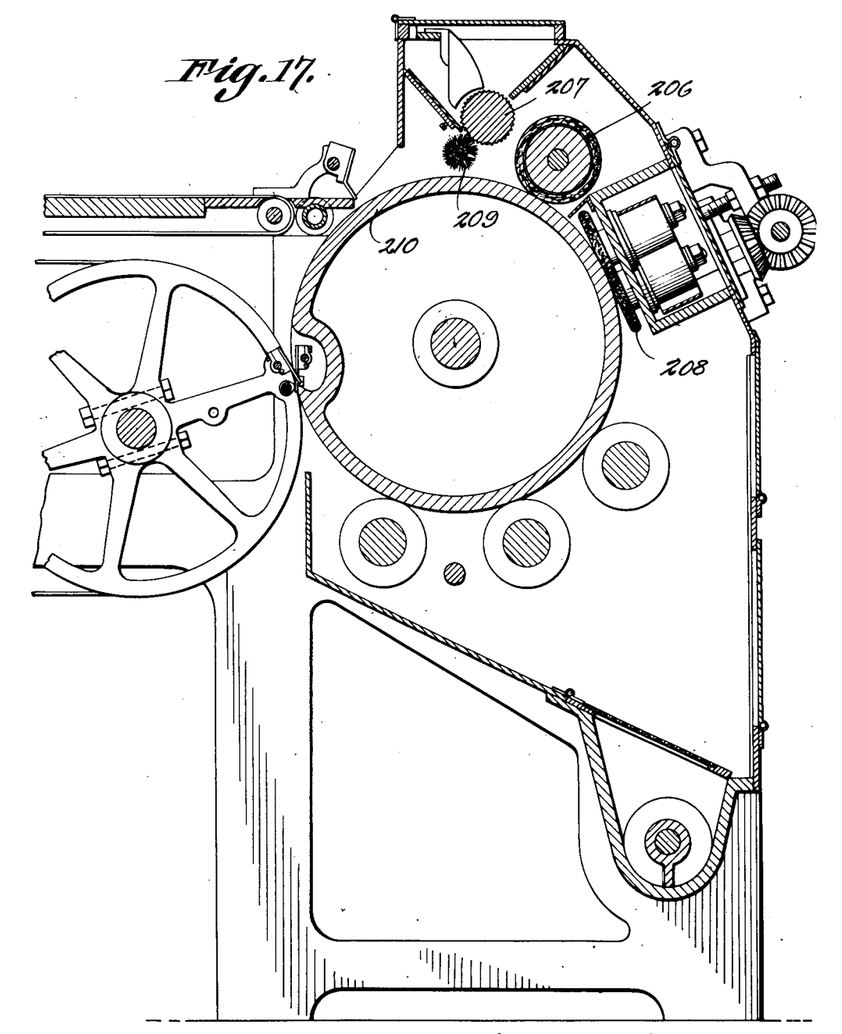
Figure 17 is a view similar to Figure 3 showing a modified structure.

In Figure 17 a slightly modified construction has been illustrated. This structure is similar to that disclosed in Figure 3 with the exception that the feeding roll 206 is positioned between the feeding roll 207 and the rubbing disks 208. Furthermore the revolving brush 209 is preferably arranged between the feeding roll 207 and the drum or cylinder 210.

Figure 18:
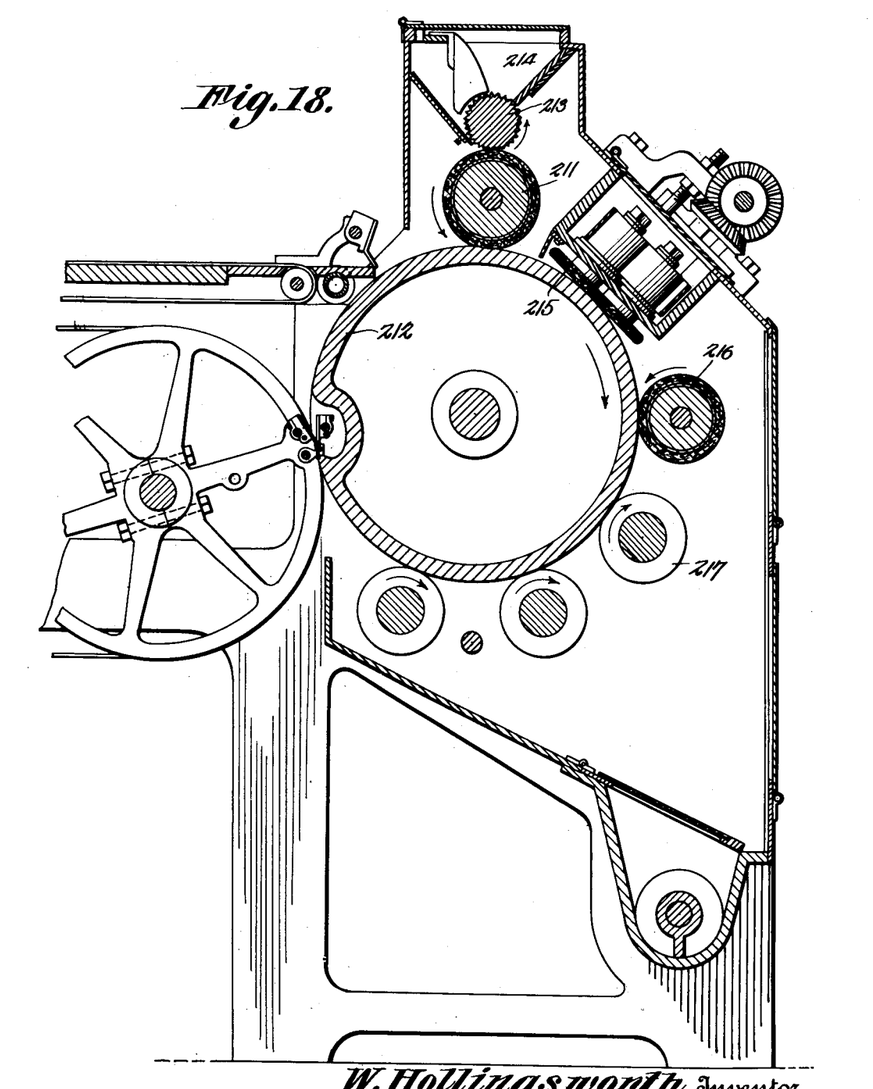
Figure 18 is a view similar to Figure 17 showing another modified structure.

In Figure 18 another slightly modified form of structure has been illustrated.

This structure includes a feed roll 211 which can be covered with wool and located between the cylinder 212 and the fountain or delivery roll 213 located in the outlet of the hopper 214. These rolls rotate in the direction indicated by the arrows and the bronze powder when delivered downwardly by the roll 213 will be taken up by the feed roll 211. This feed roll has a surface speed which is slower than the surface speed of the cylinder 212. Consequently when the sheet of paper is delivered to the pass between cylinder 212 and the roll 211 the wool surface of the roll 211 will feed the bronze evenly and smoothly over the sheet passing betwen the roll and cylinder. The polishing devices 215 are the same as those illustrated in the other forms of the device and are positioned where they will act on the sheet immediately after it emerges from beneath the feeding roll 211. An auxiliary feeding and wiping roll 216 is located beyond the polishing members 215 and travels in the direction indicated by the arrow with a surface speed less than the surface speed of the cylinder 212. This roll corresponds with the roll 140. The cleaning rolls 217 are positioned below the roll 216 and the cylinder 212 and correspond with the rolls 145.

Figure 19:
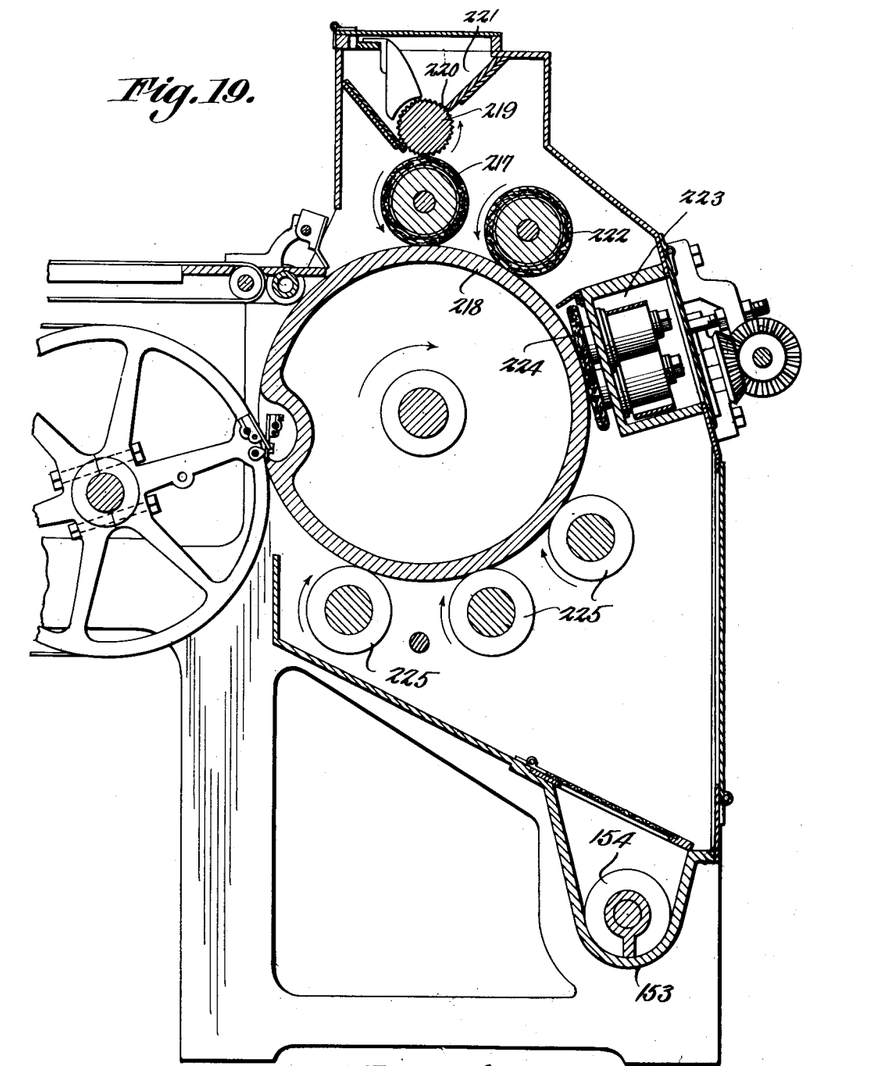
Figure 19 is a view similar to Figure 18 and showing another slightly modified structure.

Another construction showing a slight rearrangement of the feeding, polishing and spreading or wiping mechanism has been illustrated in Figure 19. In this structure a roll of the same construction as the roll 140 is interposed between the top of the drum or cylinder 218 and the feeding roll 219 located in the outlet 220 at the bottom of the hopper 221. The rolls 217 and 219 rotate in the directions indicated by the arrows. A supplemental feeding or distributing roll 222 similar in construction to the roll 217 is interposed between said roll 217 and the polishing mechanism indicated generally at 223. This polishing mechanism includes the hair covered disks 224 arranged so as to diverge from the surface of the drum or cylinder 218 and to contact with the conveyed sheet in the bronzer at points remote from the axes of rotation of the disks. This arrangement is the same as has already been disclosed in the other forms of the device. Fabric wiping or cleaning rolls 225 are arranged below the polishing disks and under the drum or cylinder as shown and operated in the same manner as the structures indicated at the corresponding positions in the other forms of the device.

In this form of device rolls 217 and 222 are operated at a surface speed less than the surface speed of the drum or cylinder 218. Consequently during the actuation of the machine, the bronze powder will be fed onto the roll 217 by the roll 219 and this roll 217 will act to conduct the powder downwardly to the surface of the sheet moving with the drum or cylinder 218. Roll 217 acts to spread the bronze over the sheet and to rub the same thereon and this operation is repeated by the roll 222 as the sheet passes between it and the cylinder or drum 218. The sheet is then polished in the usual manner by the rotating disk 224.

An important feature of this invention resides in the fact that the unused bronze is deposited in the trough 153 from which it is removed by the rotating screw or worm 154. Herefore in bronzing machines it has been necessary for an operator to scrape surplus bronze out of the machine and this operation has not only been slow and costly but has also been objectionable because of the dust created thereby.

Although in the present application the several forms of bronzing machine have been illustrated with a rotating drum or cylinder constituting the means for conveying the sheet through the bronzer it is to be understood that other means can be used for this purpose within the scope of the claims.

What is claimed is:

1. The combination with a housing, sheet conveying means therein, and movably supported rubbing means for contact with the sheets being conveyed within the housing, of a container, means for delivering material from the container onto the sheet, means for delivering an air blast across the outlet of said material delivering means between said outlet and a sheet being conveyed, for scattering material over the sheet and means for deflecting the scattered material toward the rubbing means.

2. The combination with a housing and means for conveying a sheet through the housing, of a plurality of rubbing disks in staggered relation, all rotatable in the same plane within the housing for moving engagement solely at points removed from the axes of rotation of the disks, with the sheet being conveyed, a polishing roll rotatably mounted within the housing for engagement with the sheet being conveyed, and means for directing powdered material onto the sheet in controllable quantities.

3. The combination with a housing, and means for conveying a sheet therethrough, of a plurality of rubbing disks, hair coverings upon the disks for engaging the surface of the sheet being conveyed, throughout the width of the sheet to rub the surface of said sheet, means for rotating all of the disks simultaneously and in a common plane, means for directing powdered material onto the sheet before reaching the rubbing disks, means for supporting all of the disks in position for engagement with the sheet being conveyed solely at points removed from the axes of rotation of the respective disks, and means for polishing the sheet after leaving the disks.

4. In a bronzing machine a sheet conveying means, polishing disks diverging from said means for engaging a sheet thereon solely at points remote from the axis of rotation of the respective disks, and means for applying bronze to a sheet on said conveying means prior to reaching the polishing disks.

5. In a bronzing machine a sheet conveying means, polishing disks diverging therefrom for engagement with a conveyed sheet solely at points remote from the axes of rotation of the disks, means for applying bronze to the sheet before reaching the disks, and means for cleaning the sheet leaving the disks.

6. In a bronzing machine a sheet conveying means, a bronze container, means for delivering powdered bronze therefrom, means for conducting the delivered bronze onto the sheet being conveyed, said means being movable at a surface speed slower than the surface speed of the sheet conveying means and contacting with said sheet, polishing disks for engaging the conveyed sheet, said disks diverging from the surface of the conveying means and contacting with the sheet solely at points remote from the axis of rotation of each disk 7. In a bronzing machine a sheet conveying means, a bronze container, means for delivering powdered bronze therefrom, means for conducting the delivered bronze onto the sheet being conveyed, said means being movable at a surface speed slower than the surface speed of the sheet conveying means, and contacting with said sheet, polishing disks for engaging the conveyed sheet, all of said disks being in the same plane and diverging from the surface of the conveying means, said disks contacting with the sheet solely at points removed from the axis of rotation of each disk, and a roll interposed between the feeding means and the polishing disks for engaging the sheet at a surface speed less than the surface speed of the sheet.

In testimony that I claim the foregoing as my own, I have hereto affixed my signature.

WILLIAM HOLLINGSWORTH.